July 13, 1954
C. H. VAN SCHAACK
2,683,498
HOOD GLARE DEFLECTOR FOR VEHICLES
Filed Oct. 18, 1950
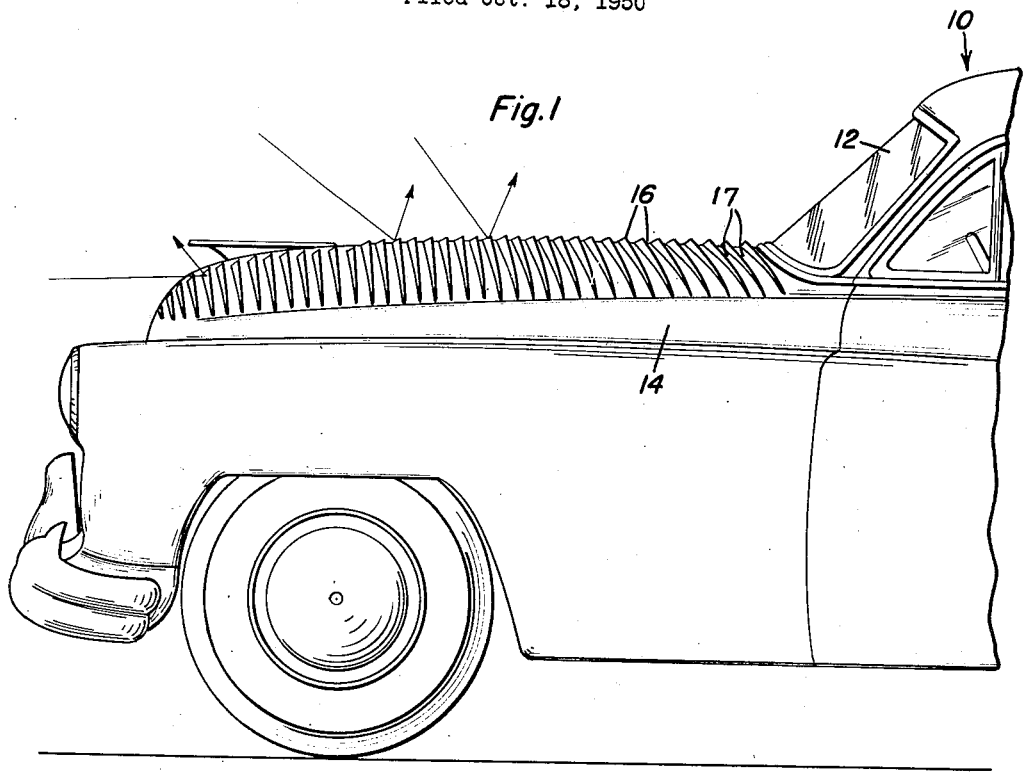
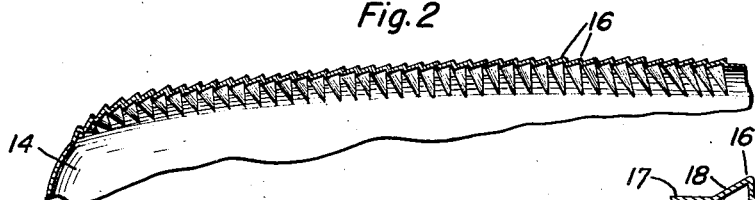
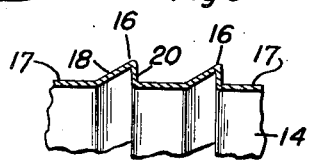
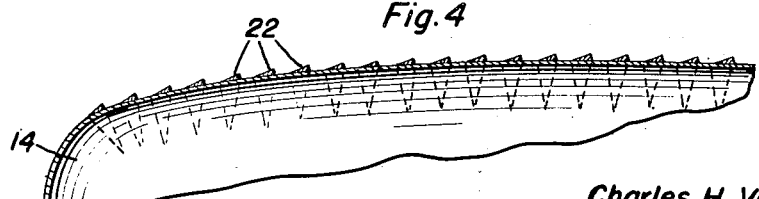
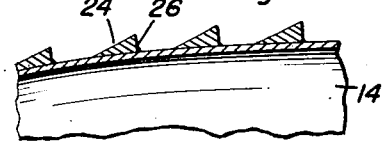
Charles H. Van Schaack
INVENTOR.

Patented July 13, 1954

2,683,498

UNITED STATES PATENT OFFICE 2,683,498

HOOD GLARE DEFLECTOR FOR VEHICLES

Charles H. Van Schaack, Sandpoint, Idaho

Application October 18, 1950, Serial No. 190,753

2 Claims. (Cl. 180—69)

This invention comprises novel and useful improvements in a glare deflector for vehicles and more specifically pertains to a relatively simple and inexpensive construction which will satisfactorily deflect glare from the sun's ray or the headlights of approaching vehicles from the windshield and the eyes of the operator of an automobile vehicle.

An important object of the invention is to provide a glare deflector for vehicles which shall minimize the discomforts and dangers attending glaring lights from headlights or from the sun's rays which tend to dazzle the eyes of the vehicle operator.

A further object of the invention is to provide a glare deflecting means which may be readily applied to existing forms of automobiles or may be easily and inexpensively incorporated into conventional automobiles at the time of their manufacture.

A still further object of the invention is to provide a glare deflecting means which shall constitute an integral part of the hood of a vehicle and this without marring the appearance of the same.

These, together with various ancillary features and objects of the invention, which will later become apparent as the following description proceeds, are attained by the present invention, a preferred embodiment of which has been illustrated by way of example only, in the accompanying drawings, wherein:

Figure 1 is a fragmentary side elevational view of a portion of a motor vehicle showing one manner in which the principles of this invention may be applied thereto;

Figure 2 is a vertical longitudinal sectional view taken through a portion of the hood of the motor vehicle at Figure 1 showing the manner in which the glare deflecting elements are arranged thereon;

Figure 3 is a detail view upon a large scale of a portion of Figure 2;

Figure 4 is a view similar to Figure 2 but showing a modified manner in which the glare deflecting elements of this invention may be applied to the hood of the vehicle; and Figure 5 is a large detail view of a portion of the arrangement in Figure 4.

Referring now more specifically to the accompanying drawings, wherein like numerals designate similar parts throughout the various views, it will be seen that the numeral 10 indicates generally a portion of an automobile vehicle which is provided with the customary sloping windshield 12 therefor, and a hood 14 covering the engine part of the vehicle and disposed forwardly of the windshield. As is well known, drivers of automobiles are frequently subjected to the dangerous and detrimental effects of dazzling lights in their eyes, occasioned at night by the headlight rays of oncoming lights which may strike the hood of a vehicle and glance and be deflected therefrom through the windshield to the driver's eyes; or which may directly pass just above the hood, through the windshield into the eyes of the vehicle operator. Further, in the daytime, the sun's rays frequently strike the hood at such an angle that the same are deflected upwardly through the windshield to the eyes of the driver thereby constituting a further driving hazard.

The glare deflecting means of the present invention therefore envisions glare deflecting elements applied to the top surface of a hood for reflecting the above mentioned sources of glare and dazzling lights in the eyes of the driver, and may be applied to the hood in a variety of manners. In the arrangement shown in Figures 2 and 3, the hood 14 is provided with integral, transversely extending rib-like formations, or ribs, indicated at 16 spaced apart longitudinally of the hood 14, and which comprise the reflecting surface 18 having a substantially vertical back wall 20 thereon. It is to be noted that although the formations, or ribs, 16 are shown in the drawing as spaced apart substantially equidistantly, the spacing may be varied and need not be equidistant. The reflecting surface 18 extends from the top of the raised back wall 20 and slopes forwardly and downwardly towards the hood as shown, whereby a reflecting surface is produced which is disposed at an acute angle with respect to the horizontal plane. Consequently, substantially horizontal rays of lights from headlights of approaching vehicles will strike these inclined reflecting surfaces and be reflected or deflected thereby away from the eyes of the operator of the vehicle. Similarly, as indicated in Figure 1, the downwardly angled rays of the sun will likewise impinge upon the reflecting surface and be reflected thereby thus protecting the driver against glare from this source. By spacing the formations, or ribs, 16 apart, as described, transversely flat, relatively depressed surfaces 17 extending transversely of the hood 14 between said formations, or ribs, 16 are provided and from which any light rays which might otherwise be reflected into the eyes of the driver are deflected by the surfaces 18 upwardly and rearwardly away from the driver's eyes.

It is evident that a reflecting surface 18 may be formed by a variety of methods, but preferably be a surface of sufficiently small area so that the same will not be too obtrusive upon the surface of the hood and mar the appearance of the same.

In the instance of existing automotive vehicles upon which it is desired to apply the reflecting elements, for realizing the advantages of this invention, the same may be carried out as shown in Figures 4 and 5, wherein a plurality of transversely extending reflecting elements indicated at 22 may be welded or otherwise fixedly secured to all or a portion of the surface of the hood 14. These elements, as in the preceding embodiment, are provided with inclined reflecting surfaces 24 and with substantially vertical back walls 26 rearwardly thereof. The function of this form of the invention is substantially identical with that previously set forth.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

Having described the invention, what is claimed as new is:

1. An anti-glare hood for an automobile comprising external ribs extending transversely across the top of the hood and permanently spaced apart longitudinally of the hood, each rib comprising a front face of light-reflecting material sloping downwardly and forwardly, and a rear non-reflecting face at an acute angle to said front face to dispose the same perpendicular to said top, said top having transversely flat portions extending transversely thereof between the ribs and to which said front faces slope downwardly, said portions being depressed relative to said ribs, the front faces of the ribs deflecting light rays reflected therefrom and from said portions upwardly and rearwardly of said hood.

2. The combination of claim 1 wherein said ribs are formed integrally with said top.

References Cited in the file of this patent
UNITED STATES PATENTS

| Number | Name | Date |
|---|---|---|
| D. 51,492 | Fageol | Nov. 20, 1917 |
| 13,615 | Goetz | Oct. 2, 1855 |
| 904,151 | Robinson | Nov. 17, 1908 |
| 2,402,963 | Hoag | July 2, 1946 |
| 2,547,342 | Nirdlinger | Apr. 3, 1951 |